United States Patent [19]
Gray

[11] 3,845,429
[45] Oct. 29, 1974

[54] SELF-TUNING UNITS

[76] Inventor: Frederick Martin Gray, 520 Burton Manor Rd., Stafford, Staffordshire, England

[22] Filed: May 31, 1973

[21] Appl. No.: 365,505

[30] Foreign Application Priority Data

July 10, 1972 Great Britain .................... 32195/72

[52] U.S. Cl. ........................ 334/16, 331/177, 333/80
[51] Int. Cl. ................................................ H03j 3/04
[58] Field of Search ......... 334/15, 16; 333/80, 80 T; 331/177

[56] References Cited

UNITED STATES PATENTS

| | | | |
|---|---|---|---|
| 2,968,773 | 1/1961 | Sandberg | 333/80 T |
| 3,237,135 | 2/1966 | Schucht | 334/15 |
| 3,413,576 | 11/1968 | Sheahan | 333/80 |
| 3,551,846 | 12/1970 | Hansen et al. | 333/80 T |
| 3,575,666 | 4/1971 | Fischman et al. | 333/80 R |
| 3,600,706 | 8/1971 | Ritchie | 334/15 |

*Primary Examiner*—James W. Lawrence
*Assistant Examiner*—Saxfield Chatmon, Jr.
*Attorney, Agent, or Firm*—Kirschstein, Kirschstein, Ottinger & Frank

[57] ABSTRACT

An automatic tuning arrangement is provided in which a tuned circuit contains a variable reactance element for varying the resonance of the tuned circuit. The value of the element is controlled by the mark/space ratio of a pulse train applied to it by a control circuit, the mark/space ratio varying with the frequency of an input signal to the tuned circuit. The arrangement is particularly useful in the protective relaying field.

7 Claims, 3 Drawing Figures

SELF-TUNING UNITS

This invention relates to tuning arrangements, and more particularly relates to such arrangements which automatically maintain a tuned circuit at resonance.

A tuning circuit according to this invention is readily utilisable over a wide variety of applications where automatic tuning to resonance is desirable to accommodate variations in a nominally fixed frequency signal, i.e. in communication technology, but in the present instance its use will be described in relation to a bridge network the instantaneous output from which is designed to be indicative of amplitudinal and/or vector changes in the input signal but which must nevertheless be maintained insensitive to any frequency drift in this signal.

One example of the application of this invention may be found in a phase selector circuit for determining faults in polyphase transmission systems as disclosed in U.S. Pat. No. 3,699,431. Another example is in distance relays employing voltage polarisation where a problem arises if the relay voltage falls to zero during a fault. In order to avoid this trouble a resonant circuit may be used to "memorise" the polarising voltage for sufficient time to guarantee operation but, as can be appreciated, the tuning of the circuit is dependent on the supply frequency and should this deviate from its nominal value then the relay may not operate correctly. Accordingly, it is important to ensure that the resonant frequency of the tuned circuit can be adjusted continuously to correspond with the supply and this may conveniently be effected by a circuit according to this invention.

Accordingly the present invention provides an automatic tuning arrangement comprising a tuned circuit incorporating a variable reactance element for varying the resonance frequency of the tuned circuit and a control circuit for controlling the value of the variable reactance element in dependence on the frequency of an input signal applied to the arrangement so as to maintain the tuned circuit substantially in resonance with the input signal frequency, wherein the value of the variable reactance element is determined by the mark/space ratio of a pulse train applied to it by the control circuit, said mark/space ratio varying with the frequency of the input signal.

An embodiment of the invention will now be described by way of example with reference to the accompanying drawings, in which.

Figures 1, 2:
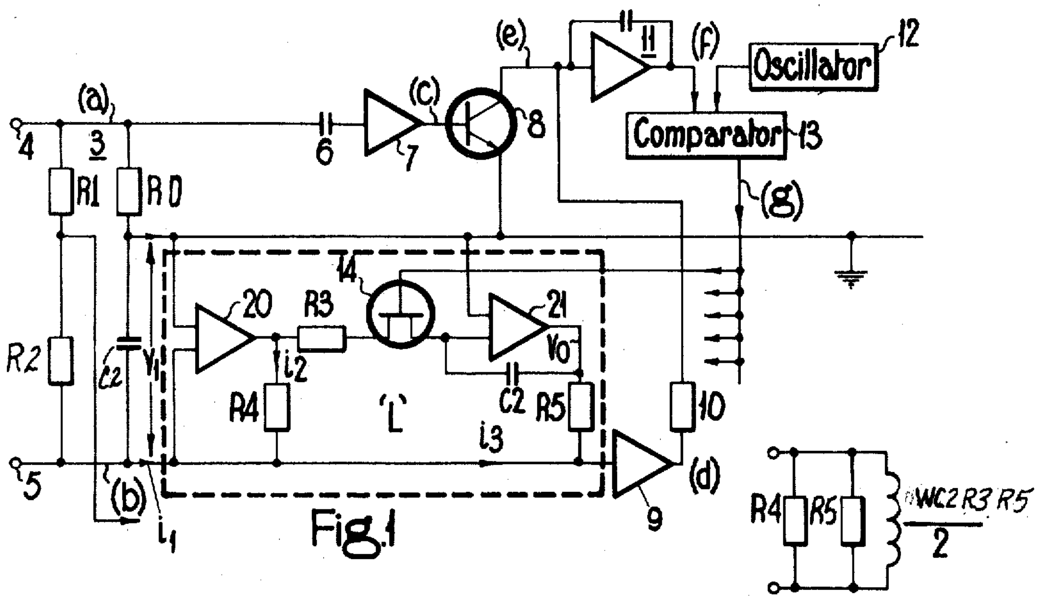
FIG. 1 is a circuit diagram of the complete tuning arrangement.
FIG. 2 is an equivalent circuit diagram of part of the circuit of FIG. 1.
Figure 3:
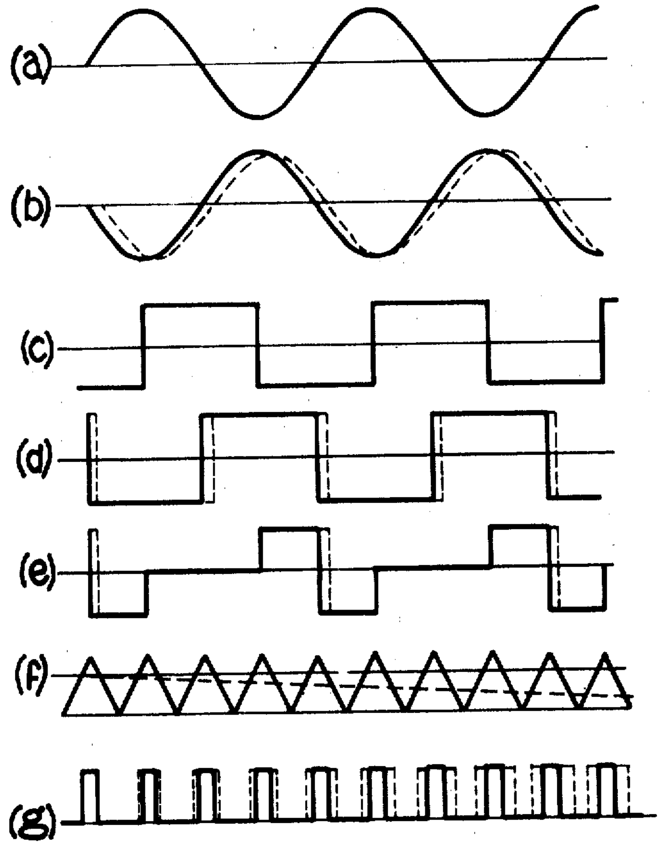

FIG. 3(*a*) to 3(*g*) illustrate waveforms at various points in the circuit of FIG. 1.

Referring now to FIG. 1, a four arm bridge network 3 is connected to receive an input signal common to its two branches on terminals 4 and 5. The bridge comprises capacitor C1 and a simulated inductance 'L' constituting a parallel tuned circuit in one arm and a resistor RD, equal to the dynamic impedance of this tuned circuit, in the other arm of one branch, with two equal value resistors R1 and R2 in the arms of the other branch.

The simulated inductance 'L' consists of an amplifier 20 having a gain of +2 and an operational amplifier 21 whose performance is determined by a feedback capacitor C2 and an input resistor R3. Load resistors R4 and R5 are connected respectively to the outputs of the amplifiers 20 and 21. The manner of inductance simulation may be described as follows:

The input impedance of the network $Z_{IN} = V_1/i_L$ $i_2 = 2V_1 - V_1/R4 = V_1/R4$ $i_3 = V_1 - V_o/R5$ $i_1 = i_3 - i_2$ $V_o = 2V_1\,(j)/(WC2) \times 1/R3 = j2V1/WC2R3$ $i_1 = V_1/R5 - j2V_1/WC2R3R5 - V_1/R4$ $i_1 = V_1\,[(1/R5 - 1/R4) - j2/WC2R3R5$ The impedance $Z_{IN}$ is therefore equivalent to a resistor of value R4R5/R4 − R5 in parallel with an inductor of value WC2R3R5/2.

The effective value of the inductor may be varied by varying the value of R3. The effective value of R3 may be varied by connecting a switch in series with it and varying the on/off time of the switch.

The mean value of current will be proportional to $t_{on}/(t_{off}+t_{on})$ and therefore the mean value of resistance will be $$R3 \times (\,(t_{off}+t_{on})/t_{on}\,)$$

The signal developed across resistor RD is applied through a capacitor 6 to a squaring and inverting amplifier 7 and thence drives a clamping transistor 8. Similarly, the signal developed across the tuned circuit is squared, but not inverted, by an amplifier 9 having an output resistor 10, and is clamped to zero by the transistor 8 in dependence on its input from the amplifier 7, the resultant waveform being integrated by an integrator 11. The output from the integrator is fed to a comparator 13 where it is compared as regards amplitude with the output of a sawtooth oscillator 12 operating at a frequency greatly in excess of the signal frequency. The output from the comparator 13 is a square waveform having a mark/space ratio which depends upon the output from the integrator. This signal is applied to a field effect transistor 14 connected between the resistor R3 and the amplifier 21 to switch it on and off and therefore give the resistor R3 in the simulated inductor an effective value of $R3 \times (\,(t_{off} + t_{on})/t_{on}\,)$. This same signal may be used to control any number of 'slave' tuned circuits in time with the master.

Considering the operation of the circuit in more detail with reference to the waveforms in FIG. 3(*a*) to 3(*g*), the voltage developed across RD (FIG. 3*a*) is, at resonance, in anti-phase with the voltage across the tuned circuit (FIG. 3*b* — full lines). The voltage across resistor RD is phase advanced 90° by the capacitor 6 and squared and inverted by the amplifier 7 to yield a signal (FIG. 3*c*) which drives the clamping transistor 8, this transistor conducting during the positive half cycles. The voltage across the tuned circuit is squared (FIG. 3*d* — full line) and clamped to zero by the action of this transistor, the whole of this voltage being dropped across the resistor 10 during the conducting periods of this transistor. The resultant input waveform to the integrator 11 is shown in FIG. 3*e* — full lines, and thus with the voltage across the two arms in the bridge network in anti-phase, the net output from the integrator does not change. The output from the oscillator is compared with the d.c. output from the integrator (FIG. 3*f*) and the comparator output (FIG. 3*g*) is seen to have a mark space ratio which is dependent upon the integrator output level.

Assuming now that the frequency of the input signal increases, the tuned circuit will become slightly capacitive its voltage lagging slightly with respect to the voltage across RD as shown by the dotted lines in FIG. 3*b*.

As a result, the coincidence with the positive portion of waveform 3*c* is such that the squared waveform across the tuned circuit (shown dotted in FIG. 3*d*) is wholly dropped across the resistor 10 over a much greater proportion of its negative cycle than over its positive cycle, with the result that the positive/negative excursions of the resultant waveform at the input to the integrator (FIG. 3*e* — dotted line) are not equal, as was previously the case. Thus, the integrator output changes, causing the comparator output signal to alter its mark space ratio, dotted lines FIG. 3*f*, *g*. This signal controls the field effect transistor switch 14 to alter the effective inductance of the simulator and restore resonance. Any number of additional 'slave' tuned circuits may be controlled from the one 'master.'

Conversely, should the frequency of the input signal decrease, then the tuned circuit will become slightly inductive and the change in the integrator output will be of the opposite sign causing the effective inductance to be changed in the opposite sense to restore resonance once more.

In this circuit, if the input frequency, amplitude and phase are constant, the input will be balanced; should any change occur, however, then the voltage across the resistor R2 will follow the change immediately while the signal across the tuned circuit will follow only gradually, at a rate depending on the frequency control loop (for frequency changes) or the 'Q' of the tuned circuit (for amplitude and phase changes). The input will therefore be temporarily unbalanced, and the output (taken from the junction of resistors R1 and R2) will follow this unbalance, thus indicating any vector changes in the input signal (frequency changes being equivalent to continuing phase changes in this respect).

I claim:

1. An automatic tuning arrangement comprising:
i. a tuned circuit;
ii. in the tuned circuit, a variable reactance element whose value determines the resonance frequency of the tuned circuit;
iii. in the variable reactance element, an impedance element whose value determines the value of the variable reactance element;
iv. a switching element connected with said impedance element so that the value of the variable reactance element depends on the ratio of the on time to the off time of the switching element;
v. a pulse generating circuit for producing a pulse train of high frequency compared with an input signal;
vi. means for utilizing the pulse train to operate the switching element so that the variable impedance element takes up a value dependent on the mark/space ratio of the pulse train; and
vii. means for varying the mark/space ratio of the pulse train in response to a difference between the resonance frequency of the tuned circuit and the frequency of the input signal in such a sense as to tend to maintain the tuned circuit in resonance with the input signal.

2. An arrangement according to claim 1 wherein said variable reactance element is a simulated inductance and said impedance element is a resistance.

3. An arrangement according to claim 2 wherein said variable reactance element includes an operational amplifier having a feedback capacitance connected between its output and an input thereof, and said resistance is connected to said input in series with said switching element.

4. An arrangement according to claim 3 wherein said switching element is a field effect transistor.

5. An arrangement according to claim 1 which further includes a four arm bridge network in which the tuned circuit and a first resistance, substantially equal in value to the dynamic impedance of the tuned circuit at resonance, form the two arms of one branch and a pair of further equal value resistances form the two arms of the other branch, the input signal being applied in common to the two branches and said means for varying the mark/space ratio being responsive to the respective signals developed across the tuned circuit and said first resistance.

6. An arrangement according to claim 5 wherein said pulse generating circuit comprises:
i. a saw-tooth waveform oscillator;
ii. an integrator; and
iii. a comparator which produces an output pulse when the difference between outputs of the integrator and oscillator is of predetermined polarity; and
iv. wherein said means for varying the mark/space ratio comprises:
a. a phase shifter which changes by 90° the relative phases of said signals developed across the tuned circuit and said resistance;
b. pulse squaring means for squaring the phase shifted signals; and
c. clamping means which clamps one squared signal at a datum value during one set of half cycles of the other squared signal, the clamped signal constituting the input of said integrator.

7. An automatic tuning arrangement according to claim 1 including at least one further tuned circuit and means for utilizing said pulse train to operate the switching element of each further tuned circuit so as to tend to maintain each further tuned circuit in resonance with the input signal.

* * * * *